J. E. DIXON.
SWEEP SHOE AND BLADE.
APPLICATION FILED MAY 12, 1915.
1,230,686.
Patented June 19, 1917.
2 SHEETS—SHEET 1.
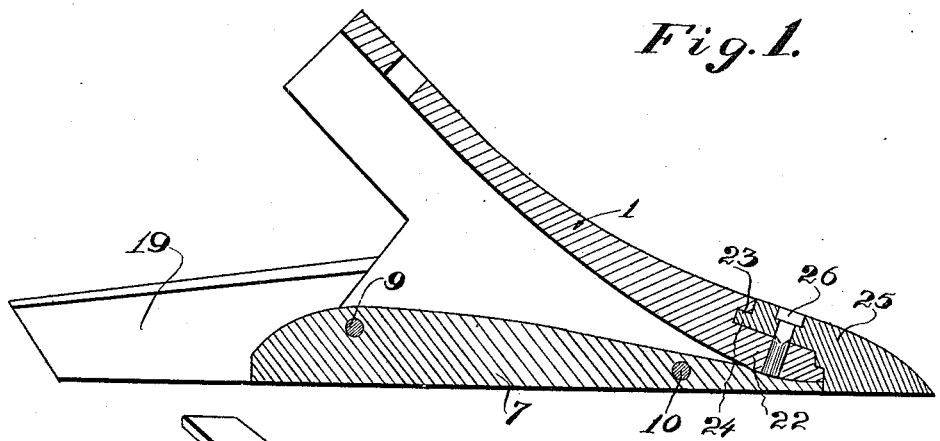
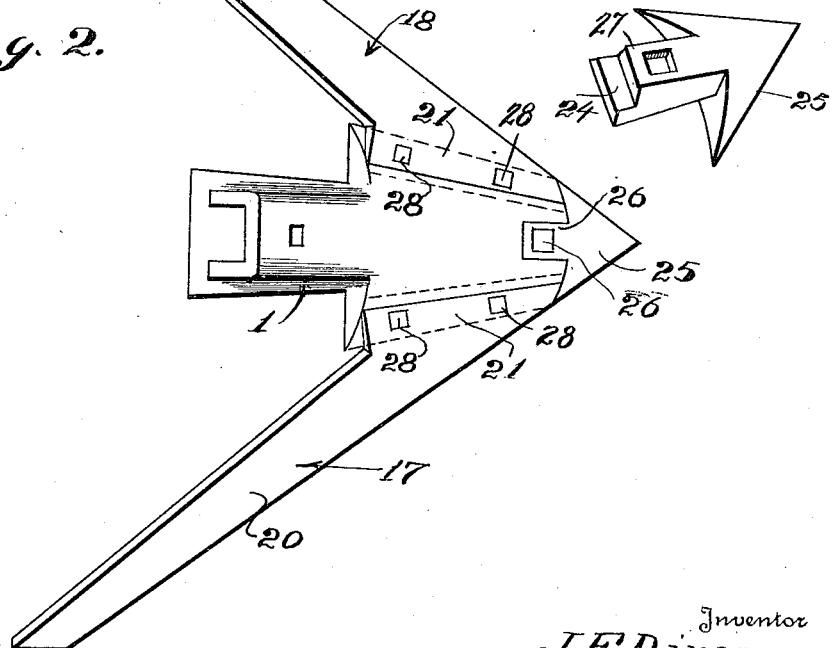
Witnesses
Inventor
J. E. Dixon
By
Attorney J. E. DIXON.
SWEEP SHOE AND BLADE.
APPLICATION FILED MAY 12, 1915.
1,230,686.
Patented June 19, 1917.
2 SHEETS—SHEET 2.
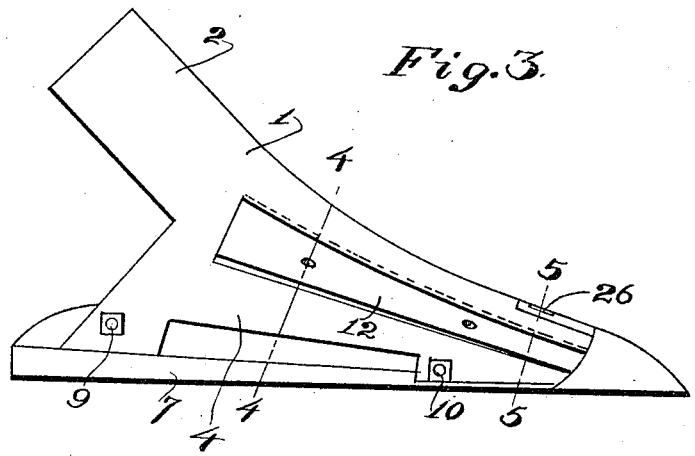
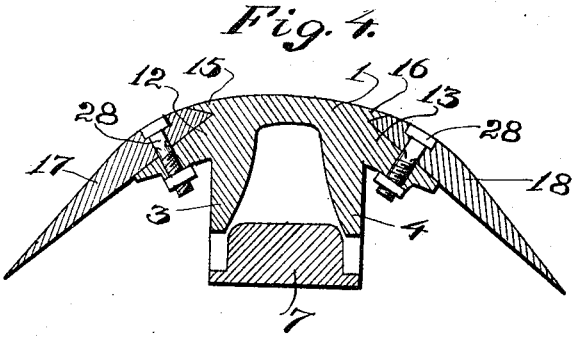
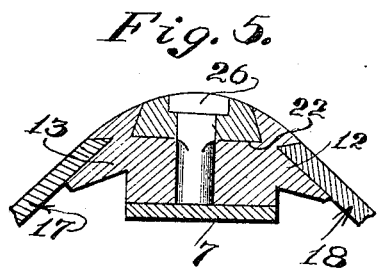
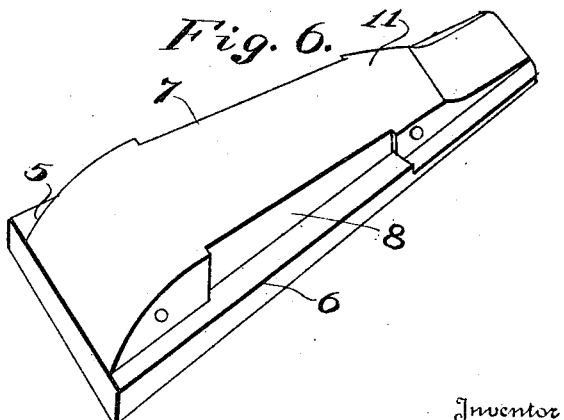
Inventor
J. E. Dixon.

UNITED STATES PATENT OFFICE.

JESSIE EARVIN DIXON, OF ANDALUSIA, ALABAMA.

SWEEP SHOE AND BLADE.

1,230,686.  Specification of Letters Patent.  Patented June 19, 1917.

Application filed May 12, 1915. Serial No. 27,575.

*To all whom it may concern:*

Be it known that I, JESSIE E. DIXON, a citizen of the United States, residing at Andalusia, in the county of Covington and State of Alabama, have invented certain new and useful Improvements in Sweep Shoes and Blades; and I do hereby declare the following to be a full, clear, and exact description of the invention, such as will enable others skilled in the art to which it appertains to make and use the same.

This invention relates to shoes and blades for sweeps, subsoilers or the like, and the primary object of the invention is to provide a device of this nature, wherein the points and the blades are detachably connected to the shoe, so that they may be changed, when desired for the purpose of replacing with either new or different sized points or blades, as may be necessary in different employments of the same.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a longitudinal section through the improved sweep blade and shoe,

Fig. 2 is a top plan view of the same,

Fig. 3 is a side elevation of the shoe, blades, points and U-shaped standards or arms.

Fig. 4 is a cross sectional view on the line 4—4 of Fig. 3,

Fig. 5 is a cross section on the line 5—5 of Fig. 3,

Fig. 6 is a detail perspective view of the bottom of the shoe, and

Fig. 7 is a perspective view of the removable point.

Referring more particularly to the drawings, 1 designates the body of the sweep blade as an entirety, which has a substantially U-shaped arm 2 formed upon the rear end thereof and extending rearwardly and upwardly therefrom, for attachment to the ordinary type of shovel or plow supporting arm or standard, with which various types of sweep blades or the like may be used.

The body 1 is substantially the shape of an inverted U in cross section, having depending sides 3 and 4, the lower edges of which rest upon the upper edges of the projecting flanges 5 and 6, which are formed upon the plate 7 of the shoe. The runner 7 of the shoe is provided with cutout portions 8, which aline with identically shaped cutout portions formed in the sides 3 and 4. The sides 3 and 4 are connected to the runner 7 by bolts 9 and 10, which extend through the sides 3 and 4 and the upstanding central portion 11 of the runner 7.

The sides 3 and 4 of the body 1 of the shoe have laterally extending plates 12 and 13 formed thereupon adjacent their upper ends. The upper surfaces of the plates or projections 12 and 13 are inclined, and they terminate at the junction with the under surfaces of relatively small projections 15 and 16 which are formed upon the upper section of the body of the shoe, and overlie the upper edges of the plates or projections 12 and 13, for forming substantially V-shaped in cross section sockets, which receive the upper edges of the attaching sections of the removable sweep blades 17 and 18. The sweep blades 17 and 18 have wings 19 and 20 formed upon the attaching sections 21 thereof and extending outwardly therefrom, which blades are positioned obliquely to the length of the shoe, when attached thereto, as is clearly shown in Fig. 2 of the drawings, for forming a sweep or a subsoiling plow.

The length of the wings 19 and 20 may be varied to suit practical conditions.

The toe of the shoe body 1 is cut away, as is shown at 22 in Fig. 1 of the drawings, and has a rearwardly extending socket or recess 23 formed therein and extending rearwardly of the rear wall of the cutaway portion. The socket 23 is provided for receiving a flange 24, which is formed upon the upper end of the removable toe or point 25 of the blade. The recess or cutaway portion 22 has inclined side walls, which form a dovetail connection with the rearwardly extending tongue 27, which is formed upon the point tongue or toe 25, so as to prevent pivotal movement of the toe with respect to the shoe. The toe or point 25 is detachably connected to the shoe by means of a bolt 26, which is inserted therethrough, and extends into the body 1 of the shoe, and it is held against accidental displacement, or pivotal movement, by the dovetailed connection with the shoe and also by the seating of the flange 24 in the socket or recess 23.

The blades 17 and 18 are attached to the projections or plates 12 and 13 by bolts 28, which have their heads countersunk in the attaching sections of the blades, and extend through the projections or plates 12 and 13.

In reducing the invention to practice, certain minor features of construction, combination and arrangement of parts may necessitate alteration, to which the patentee is entitled, provided such alterations are comprehended within the scope of what is claimed.

What is claimed is:—

1. In a sweep structure, the combination of a body, a pair of longitudinally extending lateral projections formed upon the sides of said body and having their upper surfaces positioned at an obtuse angle to the sides of the body, projections formed along the upper edges of said body and overlying the first named projections, the under surfaces of said last named projections disposed at angles to and intersecting the upper surface of said first named projection for forming angular pockets between the projections, sweep blades, the inner ends of said sweep blades being shaped to snugly fit within said pockets, and means carried by said sweep blades for detachably connecting them to said first named projections.

2. In a sweep structure, the combination of a body, a pair of longitudinally extending lateral projections formed upon the sides of said body and having their upper surfaces positioned at an obtuse angle to the sides of the body, projections formed along the upper edge of said body and overlying the first named projections, the under surfaces of said last named projections disposed at angles to and intersecting the upper surfaces of said first named projections for forming angular pockets between the projections, sweep blades, the inner ends of said sweep blades being shaped to snugly fit within said pockets, means carried by said sweep blades for detachably connecting them to said first named projections, the upper surface of said body being transversely curved, and the upper surface of said sweep blades being curved for merging with the line of curvature of the upper surface of said body.

In testimony whereof I affix my signature in presence of two witnesses.

JESSIE EARVIN DIXON.

Witnesses:
 Dud. L. O'Neal,
 C. D. Bean.

Copies of this patent may be obtained for five cents each, by addressing the "Commissioner of Patents, Washington, D. C."